Oct. 31, 1950 R. HEATH 2,527,928
POWER SHOVEL AND LOADER
Filed Jan. 6, 1947 3 Sheets-Sheet 1
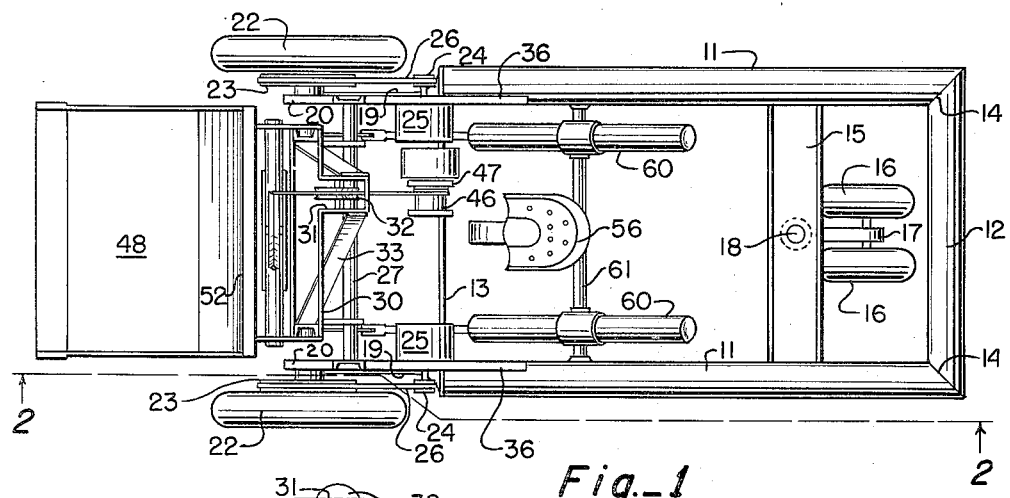
Fig._1
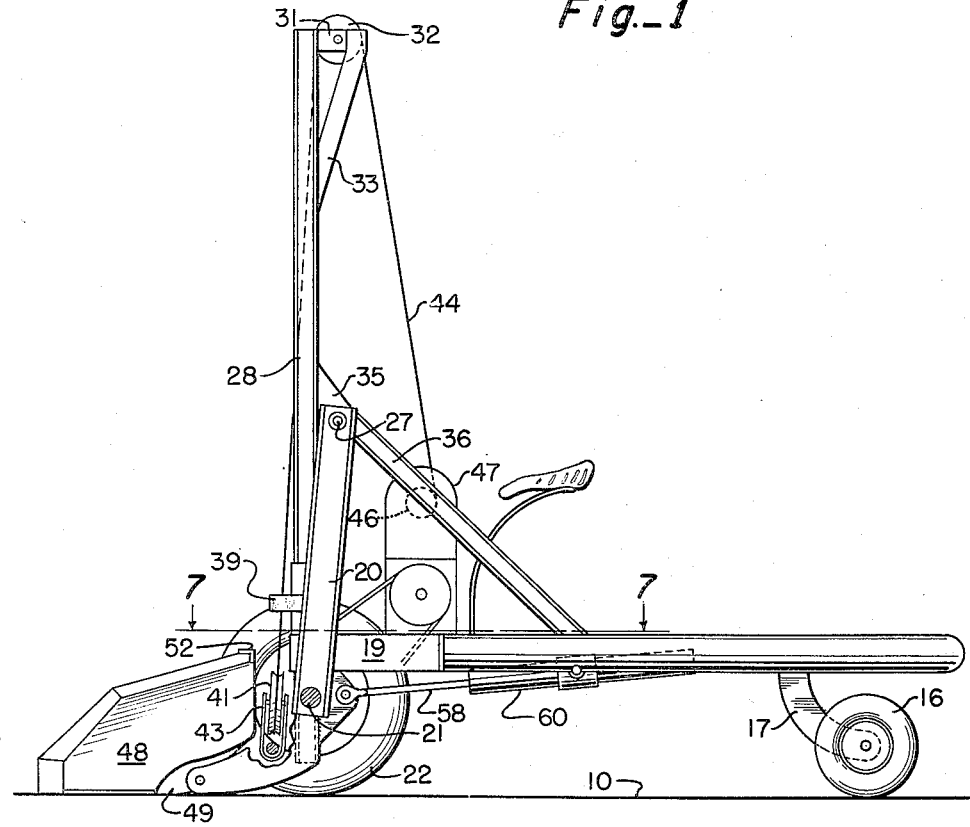
Fig._2
INVENTOR.
ROBERT HEATH
BY
Martin E Anderson
ATTORNEY Oct. 31, 1950     R. HEATH     2,527,928
POWER SHOVEL AND LOADER
Filed Jan. 6, 1947     3 Sheets-Sheet 2
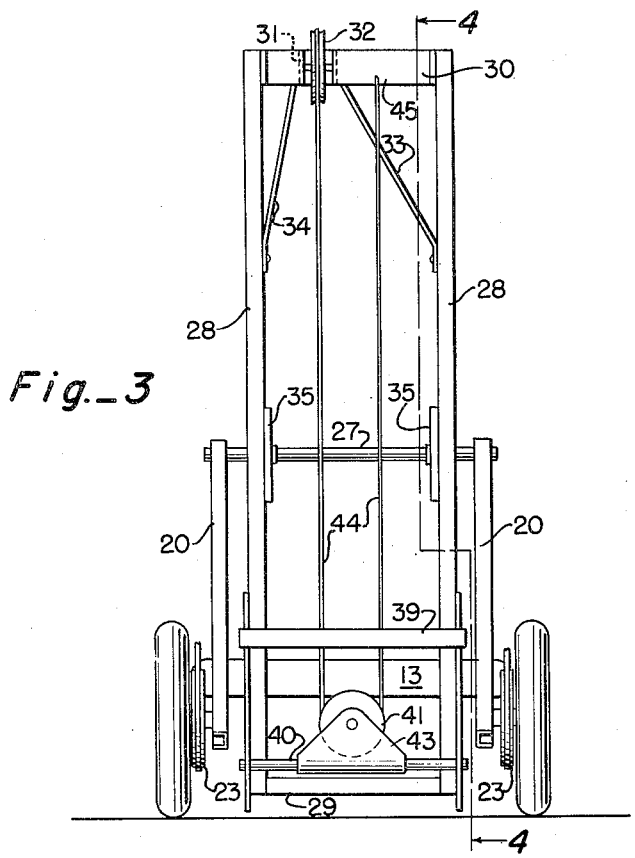
Fig._3
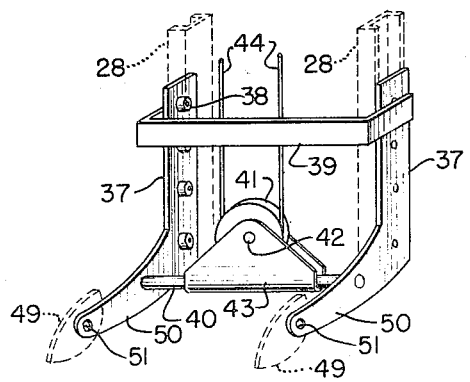
Fig._6
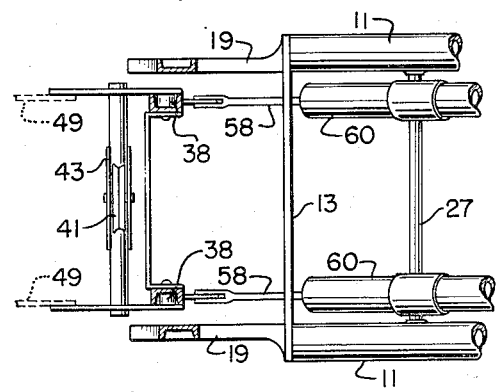
Fig._7
INVENTOR.
ROBERT HEATH
BY Martin E. Anderson
ATTORNEY

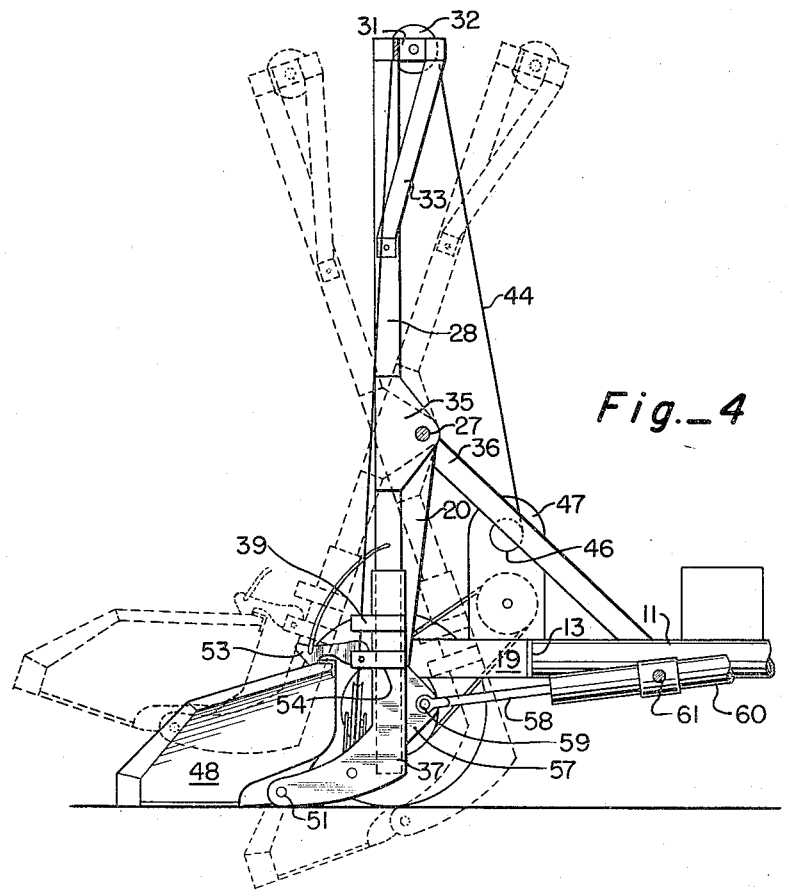
Fig._4
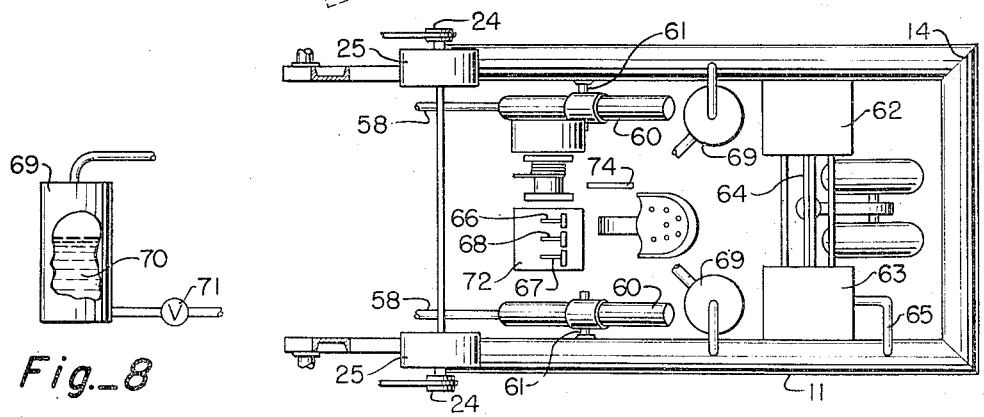
Fig._8
Fig._5
INVENTOR.
ROBERT HEATH
BY Martin E Anderson
ATTORNEY Patented Oct. 31, 1950

2,527,928

UNITED STATES PATENT OFFICE 2,527,928

POWER SHOVEL AND LOADER

Robert Heath, Fort Collins, Colo.

Application January 6, 1947, Serial No. 720,414

2 Claims. (Cl. 214—120)

This invention relates to improvements in power operated shovels and loaders.

In handling and loading various materials, such as dirt or manure, it is now quite customary to employ power operated machinery. Such machinery usually consists of a tractor having attached thereto an upwardly extending gantry frame to which a shovel, basket or other lifting means is attached for vertical sliding movement. The shovel, fork or basket, as the case may be, is raised and lowered by a winch mechanism or by hydraulic means. In devices of this type it is necessary, in order to load the shovel to move the tractor with its attached mechanism forwardly and after the shovel has been loaded, the tractor is stopped and the winch mechanism operated to raise the load to the desired height, after which the shovel is released and tilts into an angle that allows the load to be discharged onto a truck.

It is the object of this invention to produce an improved machine of the type specified, in which the gantry beam is pivoted about a transverse axis positioned a considerable distance above the tractor frame and about which pivot it is rocked by means of a hydraulic plunger or ram, both in a forward and rearward direction.

The object to be gained by this construction, briefly described, is that when the machine is brought up to a materials pile for loading, the shovel and the gantry frame on which it is carried is tilted rearwardly at the bottom of the frame so as to bring the shovel a considerable distance to the rear of its normal position. The tractor is then locked against longitudinal movement and the hydraulic rams operated to turn the gantry frame in a direction to move the shovel forwardly against the material to be loaded.

This forward movement of the shovel makes it possible to load the same without moving the tractor and in this way a lot of time is saved and the wear and tear on the tractor machinery is greatly reduced. After the shovel has been loaded, it is moved upwardly to the desired height by means of a winch mechanism and the gantry frame can then be turned so that its upper end extends forwardly, which facilitates the discharge of the load onto a truck. After the shovel and load are in the proper position, a catch is released, permitting the shovel to tilt and dump the load into the truck body.

Another object of this invention is to produce a mechanism of the class described in which the driving wheels are located near the front end of the tractor body and operated independently by separate air motors, the rear end being supported on one or more caster wheels.

A further object of the invention is to produce a machine of the class described in which the winch and driving motors are operated by compressed air and in which the hydraulic rams are operated by a liquid such as oil subjected to air pressure.

A further object of the invention is to produce a machine of the type specified in which the tractor frame is constructed of hollow members interconnected to form a reservoir for air under pressure and into which the air is compressed by means of a power driven pump.

The above and other objects that may become apparent as the description proceeds are attained by means of a construction and an arrangement of parts that will now be described in detail and for this purpose reference will be had to the accompanying drawings in which the invention has been illustrated in its preferred form, and in which:

Figure 1 is a top plan view of the tractor, parts being removed to better disclose the essential constructions;

Figure 2 is a side elevation partly in section taken on line 2—2, Figure 1;

Figure 3 is a front elevation;

Figure 4 is a side elevation similar to that shown in Figure 2, partly in section taken on line 4—4, Figure 3;

Figure 5 is a diagrammatic top plan view of the tractor frame showing the various elements of the mechanism employed;

Figure 6 is a view showing the shovel lifting arms detached from the machine;

Figure 7 is a fragmentary top plan view taken along line 7—7, Figure 2; and

Figure 8 is a diagrammatic view of the oil storage tank.

In the drawing reference numeral 10 designates the ground or any other supporting surface and reference numeral 11 designates the side frame members of the tractor frame; the rear end frame member has been designated by reference numeral 12. The plate 13 is welded to the front ends of the frame members 11. Numerals 11 and 12 are preferably formed from heavy gas pipe and are welded at the corners as indicated at 14 and to the plate 13 in such a way as to form an airtight chamber for storing compressed air. A channel beam 15 connects the two side frame members 11 at a point in front of the end member 12 and pivotally connected to this channel is a caster wheel assembly comprising two pneumatically tired wheels 16 secured to the pivoted arm 17 whose front end is provided with a trunnion 18 that turns in a suitable bearing carried by the channel. Secured to the front surface of plate 13 are side frame extensions 19. Upwardly and rearwardly ranging channel beams 20 are welded to the front ends of the extensions 19 as shown most clearly in Figure 2. Beams 20 extend below the frame members and are provided with outwardly projecting shafts 21 on which the front drive wheels 22 are pivoted. Each drive wheel is freely rotatable on its shaft and carries on its inner surface a sprocket wheel 23 that is connected with the sprocket gear pinion 24 of an air motor 25 by means of a chain 26. Instead of sprocket wheels and sprocket chains, the drive may be effected by some other suitable power transmission means such as belts or gears. Motors 25 are air motors of a well known make which are supported from the tractor frame by suitable brackets which have not been shown in the drawing because the manner of supporting these motors does not, in itself, form any part of this invention and is clearly within the scope of mechanical skill. Channel beams 20 extend upwardly to a considerable distance as shown in Figure 2 and are interconnected by means of a shaft 27.

A gantry frame comprising two upright channels 28 are connected at their lower ends by a transverse bar 29 and at their upper ends by a bar 30, the latter having a reverse bend 31 between which is mounted for rotation a sheave 32. Diagonal frames 33 and 34 extend downwardly from the reverse bend to the inner surface of channels 28 in a manner shown most clearly in Figure 3. Each of the channel bars 28 have rearwardly extending gusset plates 35 that have openings forming bearings for the shaft 27, as shown in Figure 4. Suitable diagonal braces 36 extend from the upper ends of channels 20 to the side frames 11 as shown most clearly in Figure 4. The flanges of frame members 28 extend outwardly so that the channel is on the outside of the gantry frame, and form guides for a load carrying slide which will now be described.

The slide to which the shovel or basket 48 is attached has been shown quite clearly in Figure 6 from which it will be seen that it consists of two substantially L-shaped plates 37 that are provided on their inner surfaces with a number of spaced rollers 38 of a shape and size to enter the channels in bars 28. These bars have been indicated by dotted lines in Figure 6. Plates 37 are held against spreading by means of a bar 39 welded or otherwise secured to them near their upper ends and by a round bar 40 that connects the horizontal portions of the plates 37, as shown in Figure 6. The rollers are positioned in the channels or grooves and the assembly is guided in its motion by the gantry frame. Bar 29 that connects the lower ends of the gantry frame members serves as a stop that limits the downward movement of the load supporting slide.

The sheave 41 is mounted for rotation on pivot 42 that is supported in the U-shaped strap 43 which encircles the round bar. A steel cable 44 encircles the sheave 41. One end of this cable is anchored to a stationary part of the gantry frame, for example, at point 45 on transverse bar 30. The other end of the cable extends upwardly and over sheave 32 and thence downwardly as shown in Figure 2 to drum 46 of winch 47. When the winch is operated to wind the cable onto the winch drum, the slide together with the shovel 48 will move upwardly being guided in its upward movement by the rollers 38 and the channels of the gantry frame.

In the drawing the load carrying device has been shown as a shovel and has been designated by reference numeral 48. This is merely illustrative and it may be replaced by a similar member, for example, a large fork or by any other suitable load carrying device. The under surface of the shovel has two spaced brackets or plates 49 that have been shown dotted in Figures 6 and 7 and which are secured to the front ends of arms 50 by means of pivot pins passing through the openings 51. The upper rear wall of the shovel has a transversely extending angle iron 52 that is engaged by a hook 53 connected with the plates 37 by means of a bar 54 somewhat as shown in Figure 4. A cable 55 may be connected with the latching hook 53 and extended to a suitable place adjacent the seat 56 so that it may be grasped by the operator for the purpose of releasing the shovel to effect dumping after the load has been raised to the desired height.

The latching mechanism has been shown in a more or less general way for the reason that such latching mechanism is old and well known in the art and does not comprise any part of this invention except as it forms a necessary element of the combination.

Each member 28 is provided on its rear side with a bracket plate 57 to which the front ends of piston rods 58 are connected by pivots 59. An elongated cylinder 60 is positioned on each side of the tractor frame and connected to the latter so as to permit rocking movement about pivots 61. The gantry frame can be rocked about shaft 27 by means of the hydraulic cylinders and pistons illustrated in Figure 4, from which figure it will be seen that the gantry frame may be moved from its normally full line position to either of the two positions indicated by broken lines, which are intended to designate the limits of angular movement.

Referring now more particularly to Figure 5, it will be observed that the tractor frame carries an engine 62 and an air pump 63. The engine and air pump have been shown as directly connected by shaft 64 but any other power transmitting mechanism may be employed. The exhaust of the air pump is connected with the interior of the hollow frame through a pipe 65. The hollow frame serves as an air reservoir and may, of course, be provided with necessary pressure gauges which have not been shown because such instruments are provided wherever necessary.

Also carried by the frame are two air motors 25 having sprocket pinions 24. These motors, as their name implies, are operated by compressed air coming from the air reservoir. The motors are independently controlled so that either one may be operated without operating the other or they may be operated at different speeds. In the drawing, Figure 5, the valve that controls the motor at the top of the figure has been designated by reference numeral 66 and the one that controls the motor at the bottom of the figure by reference numeral 67. The pedal 68 controls the flow of liquid to the hydraulic rams. In connection with the hydraulic rams, attention is called to the fact that air is not admitted directly into the rams, but into the top of the tanks 69 which contain oil or other liquid which has been designated by reference numeral 70 in Figure 8.

Each of these tanks contains a sufficient quantity of liquid to completely fill the cylinders at the end of the piston strokes, so that air does not enter cylinders 60. The reason for this is that although air pressure may be used for forcing the oil or other liquid into the cylinders, the air itself does not enter and therefore when the valves designated by reference numeral 71, in Figure 8, are closed, the liquid in the hydraulic ram cylinders is prevented from escaping and since the oil is practically incompressible, the piston and the gantry frame to which it is connected, are locked in any desired position.

Engine 62 may operate continuously until the pressure in the reservoir attains a maximum value. Any of the well known pressure controlled valves may be employed to automatically control the operation of the engine and to stop it in case the pressure becomes excessive. The various pipings and valves for controlling the flow of air to the air motors and the flow of liquid to the hydraulic rams have not been shown in the drawings because the exact arrangement of pipes and valves can be varied. The control of liquid and gaseous flow through pipes is well understood and since applicant intends to employ the usual and well known mechanism for such control purpose, the specific constructions have not been illustrated. The valves are all positioned in the valve chest which has been designated by reference numeral 72.

An operator occupying a position on seat 73 may control the operation of this machine by means of the pedals 66 to 68 and by the brake levers 74. The speed and direction of movement is controlled by pedals 66 and 67; when both of the air motors operate at the same speed the tractor travels forwardly in a straight line, but by increasing the speed of either motor, the tractor can be made to travel in curves or to make short turns.

After the tractor has been brought into position adjacent the material to be loaded, the gantry frame is rotated in a counterclockwise direction, when viewed as in Figure 4, bringing the shovel as far rearwardly as practical. In Figure 4 the shovel in its rearmost position has been shown as extending below the level of the supporting surface. This position is only used where the shovel is employed for excavating. Where material resting on the surface of the ground or floor is to be handled, the winch is operated to bring the shovel into the proper height for the work to be done. The operator now applies the brakes by means of handle 74 and then admits oil to the rear of the cylinders 60, forcing the lower end of the gantry frame forwardly until the shovel is filled with material. The valves to the hydraulic cylinders are now closed and the winch operated so as to raise the shovel in with its load of material to the desired height. The tractor carrying this load of material can now be run to any position where the unloading is to take place, the gantry frame is then turned by means of the hydraulic mechanism into the proper angular relation, after which the latch is released to permit the shovel to tilt about pivots 51 and permit the load to be dumped either into a truck or onto the ground in another location.

Having described the invention what is claimed as new is:

1. In a power operated loader, in combination, a tubular wheel supported frame forming an air reservoir, an air compressor supported on the frame, means for operating the compressor comprising, an internal combustion engine also supported on the frame, the discharge port of the compressor being connected with the air reservoir, two of the frame supporting wheels being drive wheels mounted for independent rotation, one on each side of the frame, near its front end, means for turning the drive wheels comprising a separate air motor for each, means for independently controlling the air motors, the rear end of the tubular frame being supported by a caster wheel, a shaft supported from the tubular frame at a point above its front end, a gantry frame mounted for swinging movement about the shaft as a pivot, means for swinging the gantry frame comprising at least one hydraulic mechanism interconnecting the tubular frame and the gantry frame, and means for controlling the operation of the hydraulic mechanism by means of the compressed air in the reservoir.

2. In a power operated loader, in combination, a frame, a pair of wheels for supporting one end thereof, fluid operated means for independently driving each of said wheels, a caster wheel for supporting the other end of said frame, a prime mover mounted on said frame, fluid compressor means driven by said prime mover, a gantry frame mounted forwardly of said pair of wheels, means pivotally mounting said gantry frame for swinging movement about a horizontal axis, a shovel movable along said gantry frame, fluid operated means for swinging said gantry frame about said pivotal axis, conduit means connecting said fluid compressor means with said fluid wheel drive means and said fluid operated swinging means, and control means for said conduit means for selectively propelling said frame and swinging said gantry frame.

ROBERT HEATH.

REFERENCES CITED

The following references are of record in the file of this patent:

UNITED STATES PATENTS

| Number | Name | Date |
|---|---|---|
| 1,176,307 | Manly | Mar. 21, 1916 |
| 1,912,816 | Anthony | June 6, 1933 |
| 2,079,695 | Patterson | May 11, 1937 |
| 2,319,456 | Hazen | May 18, 1943 |
| 2,349,353 | Johnson | May 23, 1944 |
| 2,361,333 | Towson | Oct. 24, 1944 |
| 2,362,129 | Gfrorer | Nov. 7, 1944 |
| 2,365,773 | Osgood | Dec. 26, 1944 |
| 2,394,809 | Ross | Feb. 12, 1946 |
| 2,413,661 | Stokes | Dec. 31, 1946 |
| 2,421,472 | Way | June 3, 1947 |
| 2,428,223 | Johnson | Sept. 30, 1947 |
| 2,429,170 | Royle | Oct. 14, 1947 |
| 2,437,010 | Way | Mar. 2, 1948 |
| 2,439,139 | Le Tourneau | Apr. 6, 1948 |
| 2,495,143 | Simmonds | Jan. 17, 1950 |

FOREIGN PATENTS

| Number | Country | Date |
|---|---|---|
| 444,473 | Germany | May 21, 1927 |